US012043191B2

(12) United States Patent
Wu et al.

(10) Patent No.: US 12,043,191 B2
(45) Date of Patent: Jul. 23, 2024

(54) VEHICLE STARTING POWER SUPPLY (71) Applicant: Zhejiang Safemate Automotive Safety & Emergency Technology Co., Ltd., Hangzhou (CN)

(72) Inventors: Zhonghua Wu, Hangzhou (CN); Naixing Wang, Hangzhou (CN)

(73) Assignee: Zhejiang Safemate Automotive Safety & Emergency Technology Co., Ltd., Hangzhou (CN)

( * ) Notice: Subject to any disclaimer, the term of this patent is extended or adjusted under 35 U.S.C. 154(b) by 47 days.

(21) Appl. No.: 17/821,310

(22) Filed: Aug. 22, 2022

(65) Prior Publication Data
US 2024/0017688 A1 Jan. 18, 2024

(30) Foreign Application Priority Data

Jul. 12, 2022 (CN) .......................... 202221814147.0

(51) Int. Cl.
*B60R 16/033* (2006.01)
*H02J 7/00* (2006.01)
*H02M 3/158* (2006.01)

(52) U.S. Cl.
CPC .......... *B60R 16/033* (2013.01); *H02J 7/0034* (2013.01); *H02J 7/0047* (2013.01); *H02M 3/1582* (2013.01)

(58) Field of Classification Search
CPC .............................. H02J 7/0034; H02J 7/0045
USPC ......................................... 307/10.6, 9.1–10.8
See application file for complete search history.

(56) References Cited

U.S. PATENT DOCUMENTS

2023/0344261 A1* 10/2023 McBride ............... H02J 7/0069

* cited by examiner

Primary Examiner — Rexford N Barnie
Assistant Examiner — Terrence R Willoughby
(74) Attorney, Agent, or Firm — Schwegman Lundberg & Woessner, P.A.

(57) ABSTRACT

A vehicle starting power supply is provided, which includes a control module; a charging and discharging circuit, an input of which is connected with an output of the control module, the charging and discharging circuit being configured for charging and discharging a lithium battery; a battery voltage detection circuit, an input of which is connected with an automobile battery, an output of the battery voltage detection circuit being connected with an input of the control module; a battery reverse connection detection circuit, an input of which is connected with the automobile battery, an output of the battery reverse connection detection circuit being connected with the input of the control module; an alarm response circuit, an input of which is connected with the output of the control module; and a relay driving circuit being configured for connecting or disconnecting a discharge circuit between the lithium battery and the automobile battery.

18 Claims, 8 Drawing Sheets

VEHICLE STARTING POWER SUPPLY

CROSS REFERENCE TO RELATED APPLICATION

This Non-provisional application claims priority under 35 U.S.C. § 119(a) to Chinese Patent Application No. 202221814147.0, filed on 12 Jul. 2022, the entire contents of which is hereby incorporated by reference in its entirety.

TECHNICAL FIELD

The disclosure relates to a technical field of automobile power supplies, in particular to a vehicle starting power supply.

BACKGROUND ART

With improvement of living standards, automobiles have become a necessity in people's lives. It is often encountered in driving that an automobile can't be started due to an insufficient voltage of its battery, it is necessary to resort to other power sources or other vehicles' batteries to assist in starting. If it is needed to resort to other vehicles to assist in starting, an owner of a rescued vehicle needs to wait for arrival of the other vehicles on the road. Once the rescued vehicle is trapped in a remote area, it takes a long time to be rescued, which wastes a lot of time for the owner.

A start-up power supply is a device for emergency start-up of the automobile when the battery of the automobile is damaged or electric quantity is lost, which can greatly provide backup guarantee for the owner after the battery of the automobile is with an insufficient voltage. In existing vehicle starting power supplies, separate charging and discharging circuits are adopted for independent charging circuit and discharging, which leads to complex circuits, large number of elements, high starting power supply cost; low power, low charging and discharging efficiency and high heat generation of the separate charging and discharging circuits; and high circuit power consumption of the starting power supply, which leads to a low power utilization rate of the power supply.

SUMMARY

To solve at least one of above problems, the technical schemes are provided in the disclosure as follows.

A vehicle starting power supply includes a control module, a charging and discharging circuit, a battery voltage detection circuit, a battery reverse connection detection circuit, an alarm response circuit, a display circuit and a relay driving circuit.

An input of the charging and discharging circuit is connected with an output of the control module, and the charging and discharging circuit is configured for charging and discharging a lithium battery.

An input of the battery voltage detection circuit is connected with an automobile battery, and an output of the battery voltage detection circuit is connected with an input of the control module.

An input of the battery reverse connection detection circuit is connected with the automobile battery, and an output of the battery reverse connection detection circuit is connected with the input of the control module.

An input of the alarm response circuit is connected with the output of the control module.

An input of the display circuit is connected with the output of the control module.

The relay driving circuit is configured for connecting or disconnecting a discharge circuit between the lithium battery and the automobile battery.

Furthermore, the charging and discharging circuit includes a synchronous buck-boost chip U1, a socket DC1 and a charging driving circuit. A VBUSP pin of the synchronous buck-boost chip U1 is connected to one end of a resistor R3, the other end of the resistor R3 is connected to the charging driving circuit, the charging driving circuit is connected with the socket DC1, and the charging driving circuit is electrically connected with the control module. A VBATP pin of the synchronous buck-boost chip U1 is connected to one end of a resistor R5, the other end of the resistor R5 is connected to the lithium battery, and a DIR pin and a CE pin of the synchronous buck-boost chip U1 are respectively connected to the control module.

Furthermore, the charging driving circuit includes resistors R6, R7, R8, R10, R11, R12, R14, a PMOS transistor Q1, a NMOS transistor Q2 and a NMOS transistor Q3. The resistor R10 is connected in parallel across both ends of the socket DC1, and the resistors R6 and R11 are connected in series. One end of the resistor R6 and one end of the resistor R11 are connected to two ends of the resistor R10 respectively, one end of the resistor R8 is connected to a high level, the other end of the resistor R8 is connected to a drain of the NMOS transistor Q2, a gate of the NMOS transistor Q2 is connected to the other end of the resistor R11, a source of the NMOS transistor Q2 is grounded, and a drain of the PMOS transistor Q1 is connected to one end of the resistor R6, a source of PMOS transistor Q1 is connected to one end of the resistor R7 and the other end of the resistor R3 respectively, a gate of PMOS transistor Q1 is connected to the other end of the resistor R7 and a drain of NMOS transistor Q3, a source of NMOS transistor Q3 is grounded, a gate of NMOS transistor Q3 is connected to one end of resistor R14 and one end of the resistor R12 respectively, the other end of the resistor R14 is grounded, and the other end of the resistor R12 is connected to the output of control module. The other end of the resistor R8 is connected to the input of the control module.

Furthermore, the vehicle starting power supply further includes a first USB driving circuit and a second USB driving circuit. A voltage input of the first USB driving circuit is connected to the other end of the resistor R3, and a voltage input of the second USB driving circuit is connected to the other end of the resistor R5.

Furthermore, the vehicle starting power supply further includes a power supply circuit. The power supply circuit includes a diode D5, a diode D6, a resistor R73, a capacitor C44, a capacitor C45, a capacitor C49, a capacitor C50, a capacitor C51, a voltage regulator U5 and a TVS tube T1. An anode of the diode D5 is connected to the socket DC1, and an anode of the diode D6 is connected to the lithium battery. A cathode of the diode D5 and a cathode of the diode D6 are both connected to one end of the resistor R73, the other end of the resistor R73 is connected to an input of the voltage regulator U5, the capacitor C44 and the capacitor C45 are connected in parallel to the input and a ground terminal of the voltage regulator U5 respectively, and the capacitor C49, the capacitor C50, the capacitor C51 and the TVS tube T1 are connected in parallel to an output and the ground terminal of the voltage regulator U5 respectively.

Furthermore, the vehicle starting power supply further includes a temperature detection and control circuit and a temperature operation voltage circuit. The temperature operation voltage circuit includes a resistor R70, a resistor R74, a resistor R78, an NMOS transistor Q14 and a PMOS transistor Q11. One end of the resistor R74 is connected with the output of the control module, and the other end of the resistor R74 is connected with a gate of the NMOS transistor Q14 and one end of the resistor R78 respectively, a source of the NMOS transistor Q14 and the other end of the resistor R78 are both grounded, a drain of the NMOS transistor Q14 is connected to a gate of the PMOS transistor Q11 and one end of the resistor R70, a source of the PMOS transistor Q11 and the other end of the resistor R70 are connected to the output of the voltage regulator U5, and a drain of the PMOS transistor Q11 outputs an operating voltage of the temperature detection and control circuit.

Furthermore, the temperature detection and control circuit includes a heating sheet and a temperature sensor. The temperature sensor is configured to detect a temperature of the lithium battery, and the heating sheet is configured for heating the lithium battery.

Furthermore, the vehicle starting power supply further includes a battery voltage self-checking circuit. The battery voltage self-checking circuit includes a resistor R66, a resistor R69, a resistor R75 and a capacitor C48. The resistor R66 and the resistor R75 are connected in series, one end of the resistor R66 and one end of the resistor R75 are connected to the lithium battery respectively, the resistor R69 is connected in parallel across two ends of the resistor R66, and the capacitor C48 is connected in parallel across two ends of the resistor R75. The other end of the resistor R66 is connected to the input of the control module.

Furthermore, the battery voltage detection circuit includes a resistor R81, a resistor R90, a resistor R97 and a capacitor C54. The resistor R81, the resistor R90 and the resistor R97 are sequentially connected in series. One end of the resistor R81 is connected with the lithium battery, one end of the resistor R97 is grounded. The capacitor C54 is connected across two ends of the resistor R97 in parallel, one end of the resistor R90 is connected with the automobile battery, and the other end of the resistor R90 is connected to the input of the control module.

Furthermore, the battery reverse connection detection circuit includes a diode D8, a resistor R82, a resistor R92 and an optocoupler OC1. One end of the resistor R92 is connected with a cathode of the optocoupler OC1, the other end of the resistor R92 is connected with the automobile battery, a cathode of the diode D8 is connected with an anode of the optocoupler OC1, an anode of the diode D8 is grounded, and an emitter of the optocoupler OC1 is grounded. A collector of the optocoupler OC1 is connected to one end of the resistor R82, the other end of the resistor R82 is connected to a high level, and the collector of the optocoupler OC1 is connected to the input of the control module.

Compared with the prior art, the technical schemes provided in the disclosure have the following beneficial effects.

With the charging and discharging circuit of the vehicle starting power supply of the disclosure, forward charging and reverse discharging of the lithium battery can be realized. When the lithium battery needs to be charged, the control module provides a low level output to the DIR pin of the synchronous buck-boost chip U1, and when the lithium battery needs to discharge, the control module provides a high level output to the DIR pin of the synchronous buck-boost chip U1. With controlling of the DIR pin, bi-directional operations of the lithium battery can be easily realized, a number of peripheral devices is reduced, a space of a circuit board is optimized, a design of a peripheral circuit is simplified, and thus production cost can be reduced.

In the disclosure, a temperature operation voltage circuit is further provided, and the temperature operation voltage circuit is driven by the control module to output the operation voltage for the temperature detection and control circuit, that is, working voltages of unnecessary circuits is cut off, so that power consumption of the product is kept low in a shutdown state, and standby time of products can be prolonged.

BRIEF DESCRIPTION OF THE DRAWINGS

FIG. 11 is a schematic block diagram of a vehicle starting power supply according to an embodiment of the disclosure.

DETAILED DESCRIPTION

In order to further understand contents of the present disclosure, the present disclosure will be described in detail with reference to drawings and examples.

It should be noted that the embodiments in the present disclosure and the characteristics in the embodiments can be combined mutually in the case of no conflict.

In description of this disclosure, it should be noted that unless otherwise specified and limited, terms "installing", "coupling" and "connecting" should be understood broadly, for example, it can be "fixedly connecting", "integrally connecting", or "detachably connecting"; or it can be "mechanically connecting" or "electrically connecting", or it can be "communicating within two elements"; or it can be "directly connecting" or "indirectly connecting through an intermediate medium", and specific meanings of the above terms can be understood according to specific situations for ordinary shilled in the art.

Referring to FIGS. 1 to 10, a technical scheme of the disclosure involves a vehicle starting power supply, which includes a control module, a charging and discharging circuit, a battery voltage detection circuit, a battery reverse connection detection circuit, an alarm response circuit, a display circuit and a relay driving circuit.

An input of the charging and discharging circuit is connected with an output of the control module, and the charging and discharging circuit is configured for charging and discharging a lithium battery.

An input of the battery voltage detection circuit is connected with an automobile battery, and an output of the battery voltage detection circuit is connected with an input of the control module.

An input of the battery reverse connection detection circuit is connected with the automobile battery, and an output of the battery reverse connection detection circuit is connected with the input of the control module.

An input of the alarm response circuit is connected with the output of the control module.

An input of the display circuit is connected with the output of the control module.

The relay driving circuit is configured for connecting or disconnecting a discharge circuit between the lithium battery and the automobile battery.

Figure 1:
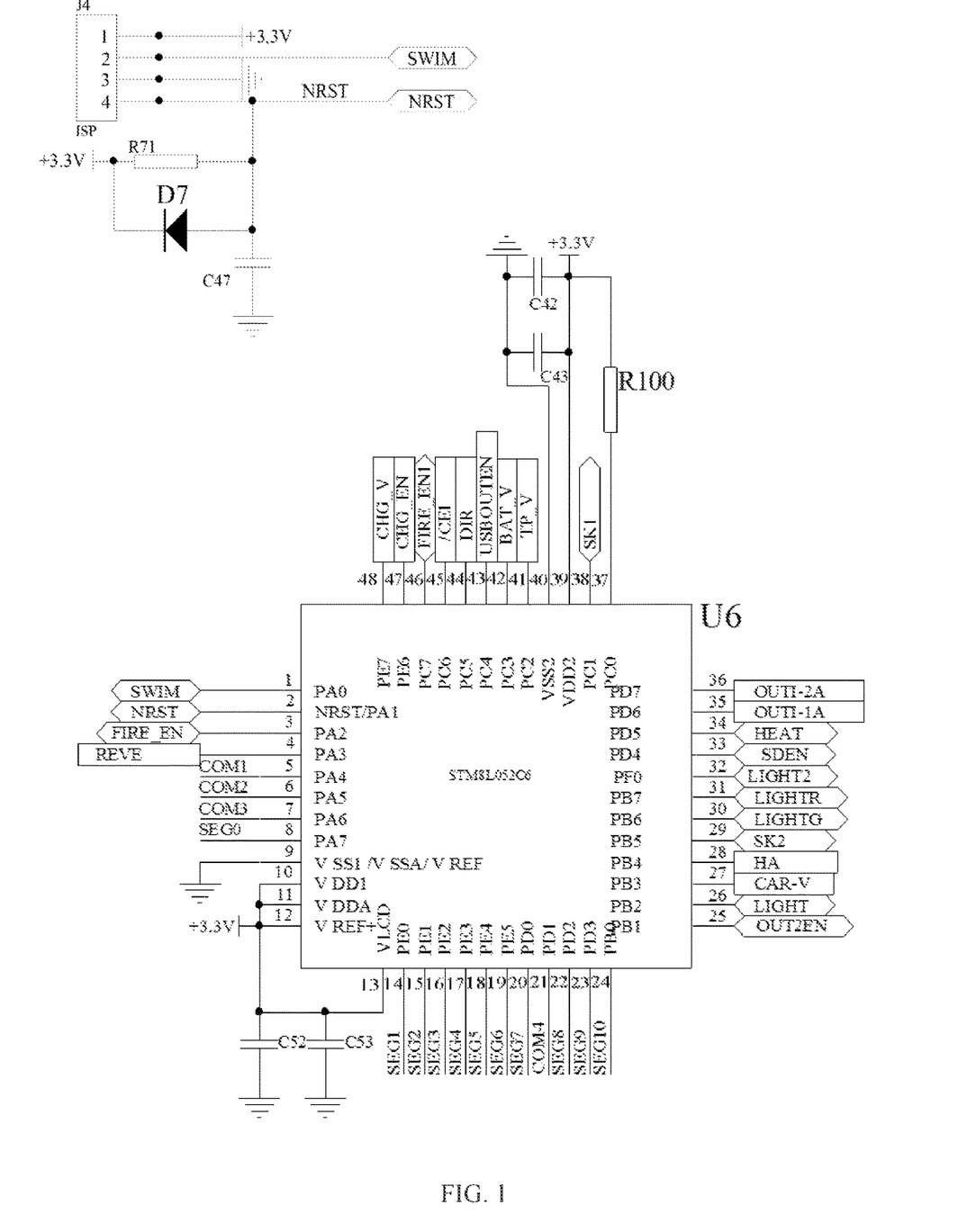
FIG. 1 is a circuit schematic diagram of a control module according to an embodiment of the disclosure.

In this embodiment, the control module is of a model STM8L052C6.

Figure 2A:
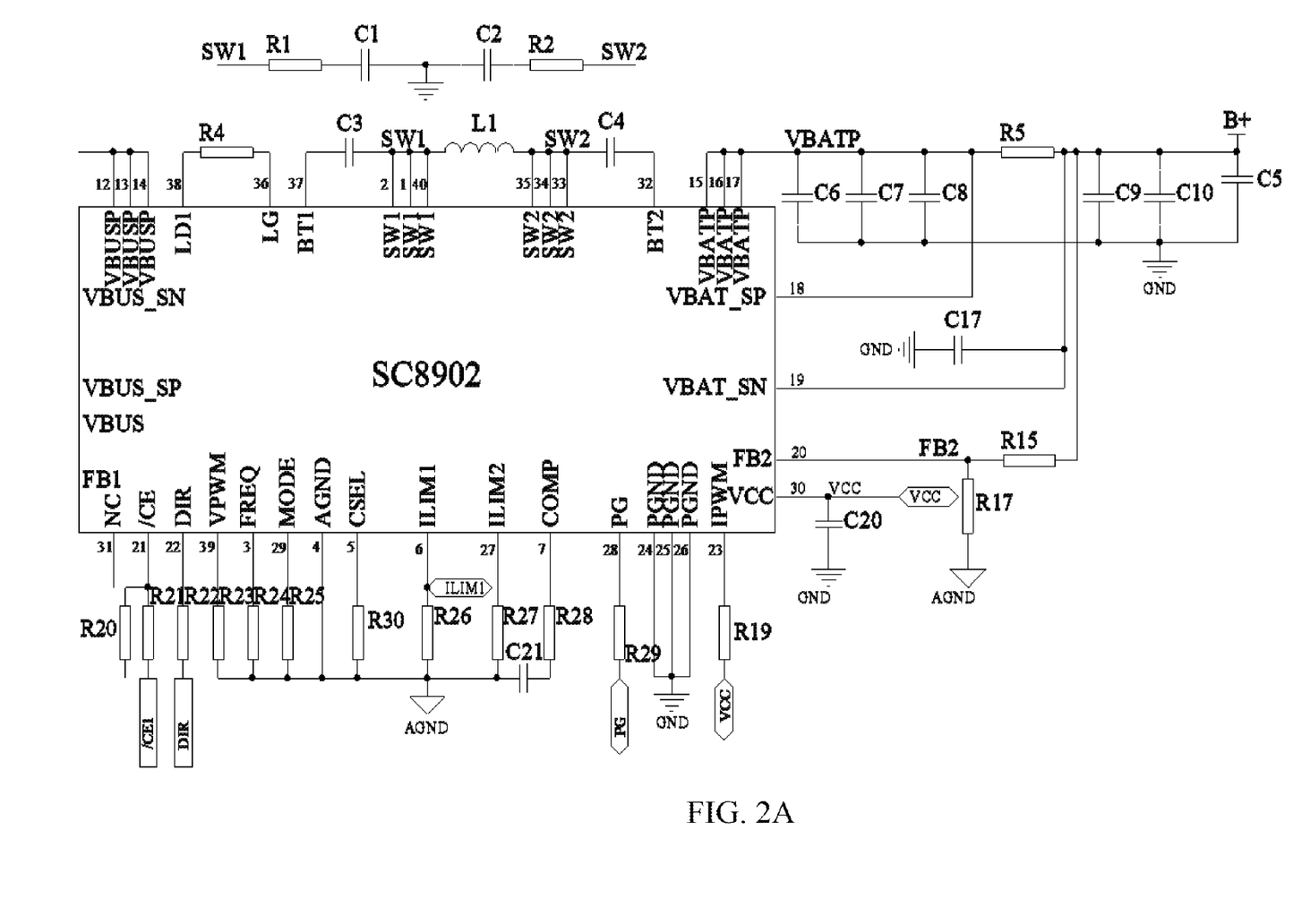
FIG. 2A and FIG. 2B are schematic diagrams of a charging and discharging circuit according to an embodiment of the disclosure.
Figure 2B:
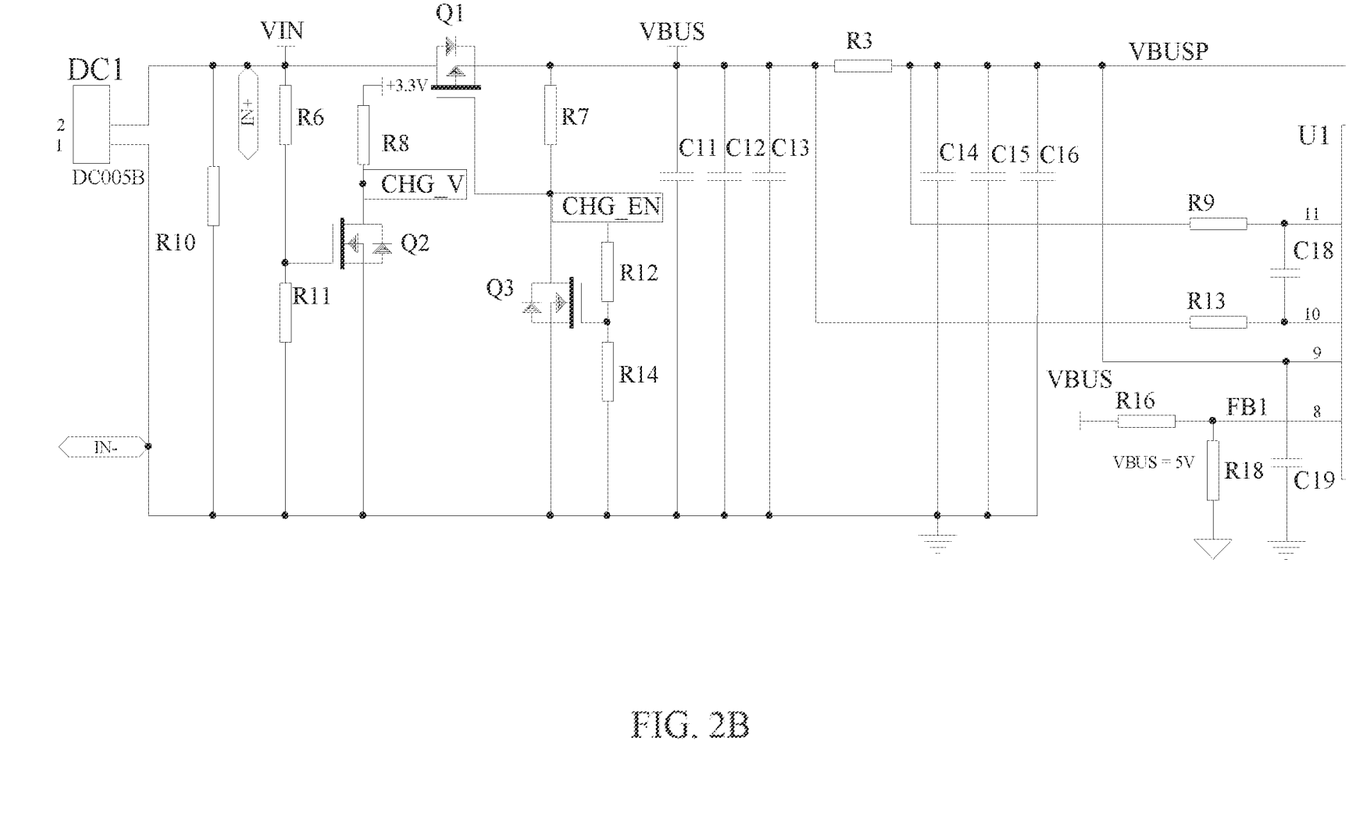

In this embodiment, the charging and discharging circuit includes a synchronous buck-boost chip U1, a socket DC1 and a charging driving circuit. The synchronous buck-boost chip U1 is of a model SC8902 produced by Nanxin Company. A VBUSP pin of the synchronous buck-boost chip U1 is connected to one end of a resistor R3, the other end of the resistor R3 is connected to the charging driving circuit, the charging driving circuit is connected with the socket DC1, and the charging driving circuit is electrically connected with the control module. A VBATP pin of the synchronous buck-boost chip U1 is connected to one end of a resistor R5, the other end of the resistor R5 is connected to the lithium battery, and a DIR pin and a CE pin of the synchronous buck-boost chip U1 are respectively connected to the control module.

In the above embodiment, the control module provides a low level or a high level output to the DIR pin of the synchronous buck-boost chip U1 to realize forward charging or reverse discharging of the synchronous buck-boost chip U1. When the DIR pin is at a low level, the synchronous buck-boost chip U1 serves to charge, and the VBATP pin outputs a charging B+ voltage of the lithium battery. When the DIR pin is at a high level, the synchronous buck-boost chip U1 serves to discharge, and the VBUSP pin outputs a discharging VBUS voltage of the lithium battery.

In this embodiment, as shown in FIG. 2 (In order to show the details of the drawings more clearly, FIG. 2 is divided into FIG. 2A and FIG. 2B, and FIG. 2A and FIG. 2B are connected at corresponding places), the charging driving circuit includes resistors R6, R7, R8, R10, R11, R12, R14, a PMOS transistor Q1, a NMOS transistor Q2 and a NMOS transistor Q3. The resistor R10 is connected in parallel across both ends of the socket DC1, and the resistors R6 and R11 are connected in series. One end of the resistor R6 and one end of the resistor R11 are connected to two ends of the resistor R10 respectively, one end of the resistor R8 is connected to a high level, the other end of the resistor R8 is connected to a drain of the NMOS transistor Q2, a gate of the NMOS transistor Q2 is connected to the other end of the resistor R11, a source of the NMOS transistor Q2 is grounded, and a drain of the PMOS transistor Q1 is connected to one end of the resistor R6, a source of PMOS transistor Q1 is connected to one end of the resistor R7 and the other end of the resistor R3 respectively, a gate of PMOS transistor Q1 is connected to the other end of the resistor R7 and a drain of NMOS transistor Q3, a source of NMOS transistor Q3 is grounded, a gate of NMOS transistor Q3 is connected to one end of resistor R14 and one end of the resistor R12 respectively, the other end of the resistor R14 is grounded, and the other end of the resistor R12 is connected to the output of control module. The other end of the resistor R8 is connected to the input of the control module.

In the above embodiment, the other end CHG_V of the resistor R8 is connected to the input of the control module, for detecting whether the socket DC1 is connected with an external power supply, so that the control module outputs a CHG_EN signal to the other end of the resistor R12, and the charging driving circuit is turned on to charge the lithium battery.

In the above embodiment, other peripheral elements of the synchronous buck-boost chip U1 are shown in FIG. 2, which will not be repeatedly described here.

Figure 3:
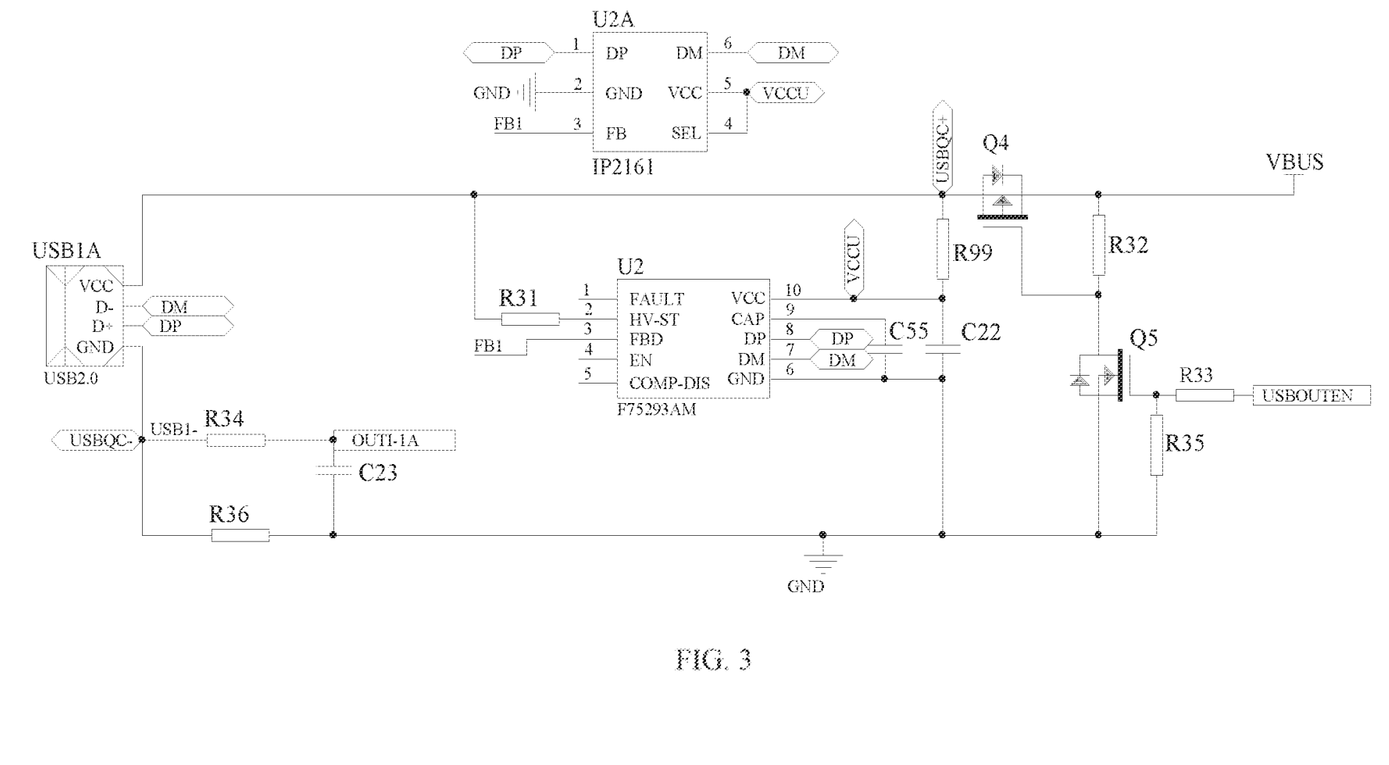
FIG. 3 is a schematic diagram of a first USB driving circuit according to an embodiment of the disclosure.
Figure 4:
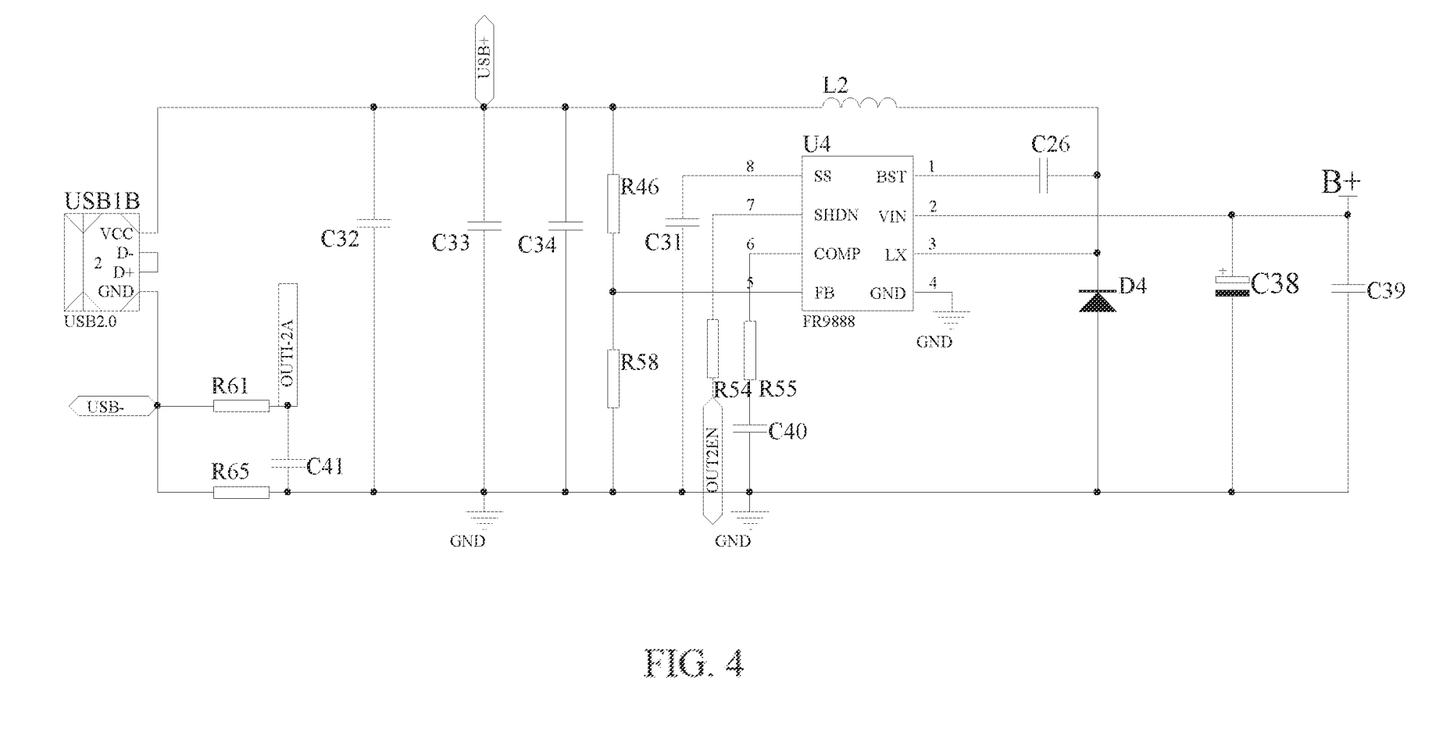
FIG. 4 is a schematic diagram of a second USB driving circuit according to an embodiment of the disclosure.

In this embodiment, as shown in FIG. 3 and FIG. 4, the vehicle starting power supply further includes a first USB driving circuit and a second USB driving circuit. A voltage input of the first USB driving circuit is connected to the other end of the resistor R3, and a voltage input of the second USB driving circuit is connected to the other end of the resistor R5. The first USB drive circuit supplies USB power to outside when discharging. The second USB drive circuit supplies USB power to outside when charging.

Figure 5:
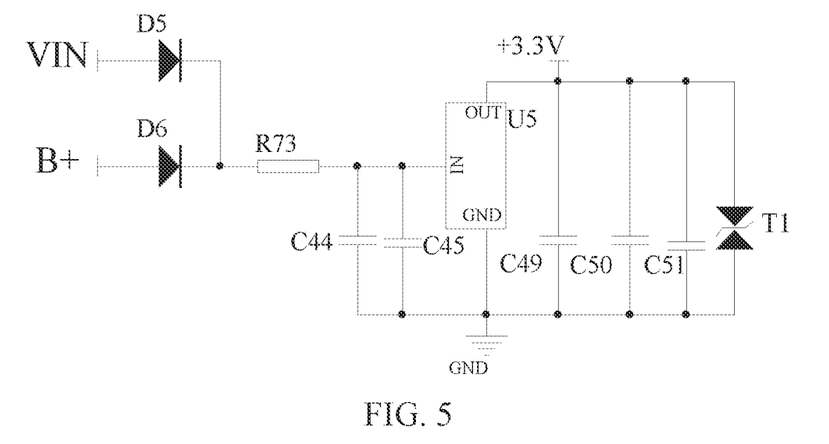
FIG. 5 is a schematic diagram of a power supply circuit according to an embodiment of the disclosure.

In this embodiment, as shown in FIG. 5, the vehicle starting power supply further includes a power supply circuit. The power supply circuit includes a diode D5, a diode D6, a resistor R73, a capacitor C44, a capacitor C45, a capacitor C49, a capacitor C50, a capacitor C51, a voltage regulator U5 and a TVS tube T1. An anode of the diode D5 is connected to the socket DC1, and an anode of the diode D6 is connected to the lithium battery. A cathode of the diode D5 and a cathode of the diode D6 are both connected to one end of the resistor R73, the other end of the resistor R73 is connected to an input of the voltage regulator U5, the capacitor C44 and the capacitor C45 are connected in parallel to the input and a ground terminal of the voltage regulator U5 respectively, and the capacitor C49, the capacitor C50, the capacitor C51 and the TVS tube T1 are connected in parallel to an output and the ground terminal of the voltage regulator U5 respectively. The charging and discharging circuit provides an input voltage to the power supply circuit in charging or discharging: a VIN voltage on a socket DC1 side or a B+ voltage on a lithium battery side.

In the above embodiment, the voltage regulator U5 of a corresponding model is set according to a power supply voltage, and a preferred voltage regulator in this embodiment is a HT71 series voltage regulator.

Figure 6:
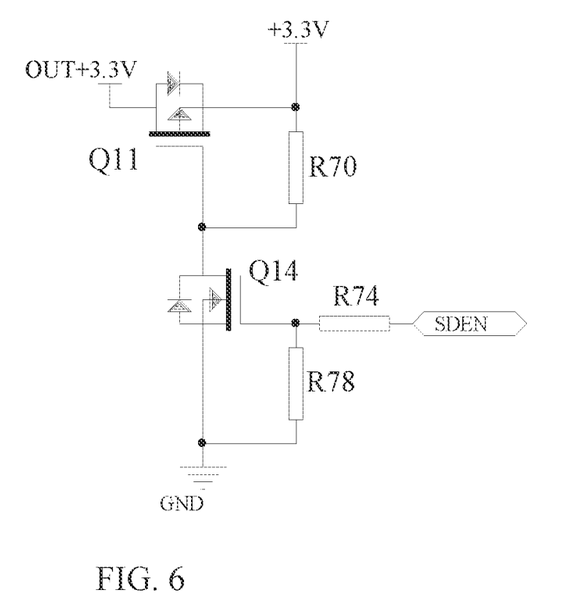
FIG. 6 is a schematic diagram of a temperature operation voltage circuit according to an embodiment of the disclosure.

In this embodiment, the vehicle starting power supply further includes a temperature detection and control circuit and a temperature operation voltage circuit. As shown in FIG. 6, the temperature operation voltage circuit includes a resistor R70, a resistor R74, a resistor R78, an NMOS transistor Q14 and a PMOS transistor Q11. One end of the resistor R74 is connected with the output of the control module, and the other end of the resistor R74 is connected with a gate of the NMOS transistor Q14 and one end of the resistor R78 respectively, a source of the NMOS transistor Q14 and the other end of the resistor R78 are both grounded, a drain of the NMOS transistor Q14 is connected to a gate of the PMOS transistor Q11 and one end of the resistor R70, a source of the PMOS transistor Q11 and the other end of the resistor R70 are connected to the output of the voltage regulator U5, and a drain of the PMOS transistor Q11 outputs an operating voltage of the temperature detection and control circuit. When the temperature detection and control circuit does not need to operate, a low-level SDEN signal from the output of the control module is sent to the temperature operation voltage circuit to turn off an operating voltage of the temperature detection and control circuit, thereby reducing overall power consumption of the product.

In this embodiment, the temperature detection and control circuit is electrically connected with the control module, and the temperature detection and control circuit includes a heating sheet and a temperature sensor. The temperature sensor is configured to detect a temperature of the lithium battery, and the heating sheet is configured for heating the lithium battery. The temperature sensor feeds back the temperature of the lithium battery. When the temperature of the lithium battery is low, the control module outputs a signal to cause the heating sheet to operate to raise the temperature of the lithium battery.

Figure 7:
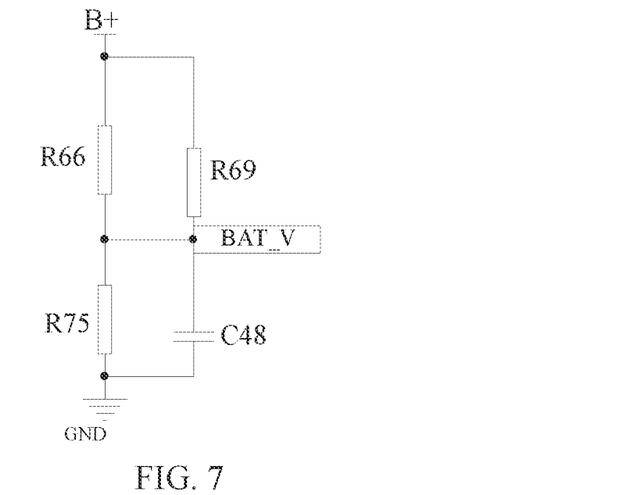
FIG. 7 is a schematic diagram of a battery voltage self-checking circuit according to an embodiment of the disclosure.

In this embodiment, as shown in FIG. 7, the vehicle starting power supply further includes a battery voltage self-checking circuit. The battery voltage self-checking circuit includes a resistor R66, a resistor R69, a resistor R75 and a capacitor C48. The resistor R66 and the resistor R75 are connected in series, one end of the resistor R66 and one end of the resistor R75 are connected to the B+ voltage of the lithium battery respectively, the resistor R69 is connected in parallel across two ends of the resistor R66, and the capacitor C48 is connected in parallel across two ends of the resistor R75. The other end of the resistor R66 is connected to the input of the control module. A voltage signal BAT_V of the lithium battery is detected by resistance division, so as to calculate electric quantity of the lithium battery. When the electric quantity of the lithium battery is lower than a certain threshold, it is prompted through the alarm response circuit and the display circuit.

Figure 8:
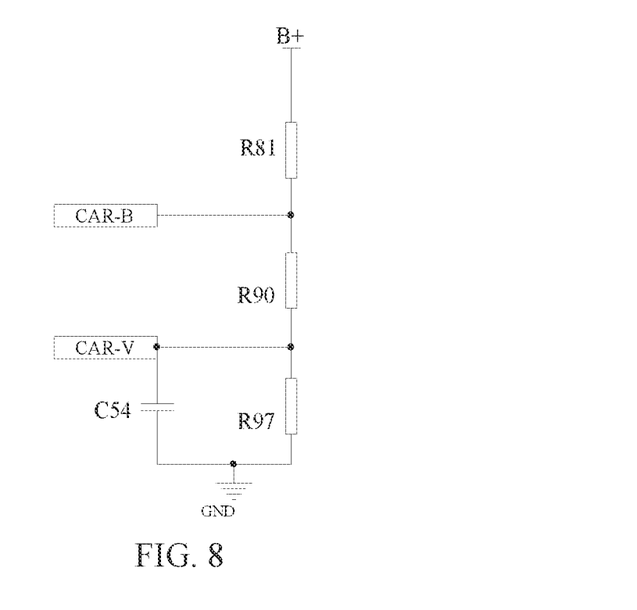
FIG. 8 is a schematic diagram of a battery voltage detection circuit according to an embodiment of the disclosure.

In this embodiment, as shown in FIG. 8, the battery voltage detection circuit includes a resistor R81, a resistor R90, a resistor R97 and a capacitor C54. The resistor R81, the resistor R90 and the resistor R97 are sequentially connected in series. One end of the resistor R81 is connected with the B+ voltage of the lithium battery, one end of the resistor R97 is grounded. The capacitor C54 is connected across two ends of the resistor R97 in parallel, one end of the resistor R90 is connected with the automobile battery CAR-B, and the other end CAR-V of the resistor R90 is connected to the input of the control module. The battery voltage detection circuit can detect whether a battery clip is connected properly. When the battery clip is short-circuited or connected to a same conductor, the control module receives the CAR-V signal, determines that the battery clip is short-circuited, gives a prompt through the alarm response circuit and the display circuit, and does not execute operations of the relay driving circuit.

Figure 9:
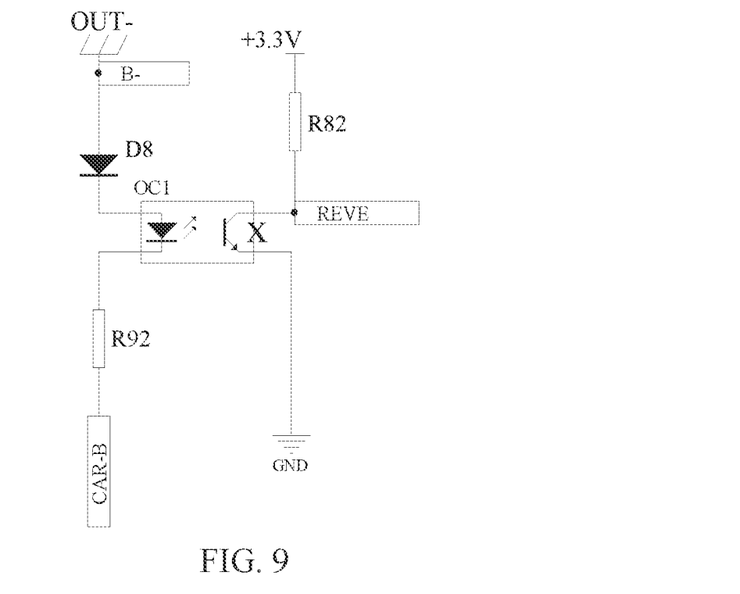
FIG. 9 is a schematic diagram of a battery reverse connection detection circuit according to an embodiment of the disclosure.
Figure 10:
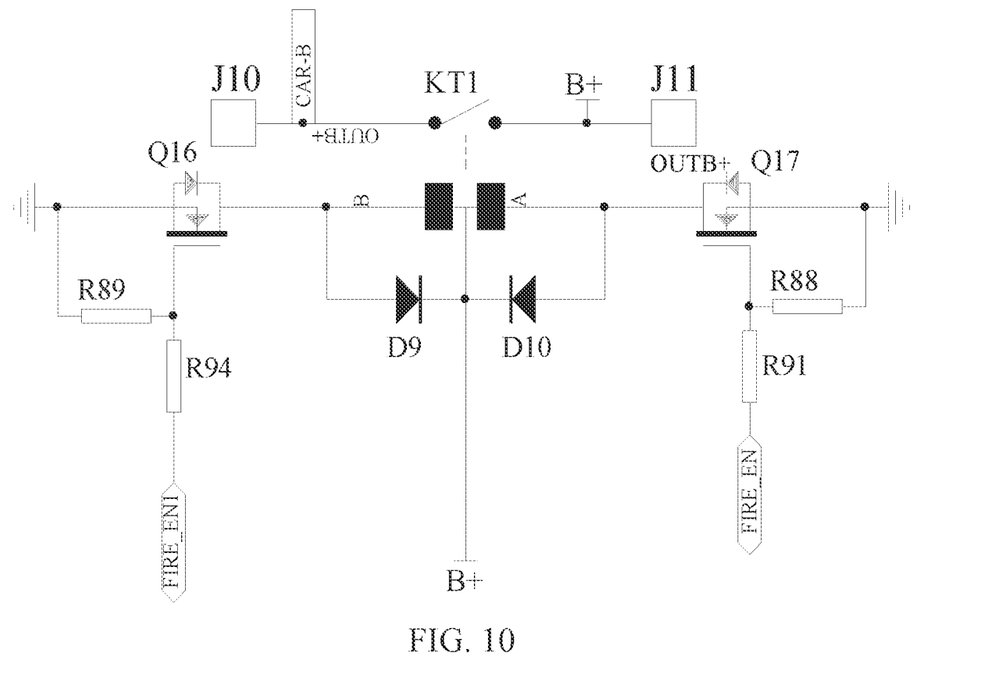
FIG. 10 is a schematic diagram of a relay driving circuit according to an embodiment of the disclosure.

In this embodiment, as shown in FIG. 9, the battery reverse connection detection circuit includes a diode D8, a resistor R82, a resistor R92 and an optocoupler OC1. One end of the resistor R92 is connected with a cathode of the optocoupler OC1, the other end of the resistor R92 is connected with the automobile battery CAR-B, a cathode of the diode D8 is connected with an anode of the optocoupler OC1, an anode of the diode D8 is grounded, and an emitter of the optocoupler OC1 is grounded. A collector of the optocoupler OC1 is connected to one end of the resistor R82, the other end of the resistor R82 is connected to a high level, and the collector of the optocoupler OC1 is connected to the input of the control module. The battery reverse connection detection circuit can detect whether the battery is reversely connected. When the battery is reversely connected, the control module receives a REVE signal collected at a collector of the optocoupler OC1 to determine that the battery is reversely connected, and also gives a prompt through the alarm response circuit and the display circuit, and does not execute operations of the relay driving circuit.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skills in the art inspired by this disclosure without creativity, without departing from the creative purpose of the present disclosure, are all within a protection scope of the present disclosure.

What is claimed is:

1. A vehicle starting power supply, comprising: a control module; a charging and discharging circuit, an input of the charging and discharging circuit being connected with an output of the control module, the charging and discharging circuit being configured for charging and discharging a lithium battery; a battery voltage detection circuit, an input of the battery voltage detection circuit being connected with an automobile battery, an output of the battery voltage detection circuit being connected with an input of the control module; a battery reverse connection detection circuit, an input of the battery reverse connection detection circuit being connected with the automobile battery, an output of the battery reverse connection detection circuit being connected with the input of the control module; an alarm response circuit, an input of the alarm response circuit being connected with the output of the control module; a display circuit, an input of the display circuit being connected with the output of the control module; and a relay driving circuit being configured for connecting or disconnecting a discharge circuit between the lithium battery and the automobile battery;

wherein the charging and discharging circuit comprises a synchronous buck-boost chip, a socket and a charging driving circuit, a VBUSP pin of the synchronous buck-boost chip being connected to one end of a resistor, the other end of the resistor being connected to the charging driving circuit, the charging driving circuit being connected with the socket, the charging driving circuit being electrically connected with the control module, a VBATP pin of the synchronous buck-boost chip being connected to one end of a resistor, the other end of the resistor being connected to the lithium battery, and a DIR pin and a CE pin of the synchronous buck-boost chip being respectively connected to the control module.

2. The vehicle starting power supply according to claim 1, wherein the charging driving circuit comprises resistors, a PMOS transistor, a NMOS transistor and a NMOS transistor, the resistor being connected in parallel across both ends of the socket, and the resistors being connected in series, one end of the resistor and one end of the resistor being connected to two ends of the resistor respectively, one end of the resistor being connected to a high level, the other end of the resistor being connected to a drain of the NMOS transistor, a gate of the NMOS transistor being connected to the other end of the resistor, a source of the NMOS transistor being grounded, and a drain of the PMOS transistor being connected to one end of the resistor, a source of PMOS transistor being connected to one end of the resistor and the other end of the resistor respectively, a gate of PMOS transistor being connected to the other end of the resistor and a drain of NMOS transistor, a source of NMOS transistor being grounded, a gate of NMOS transistor being connected to one end of resistor and one end of the resistor respectively, the other end of the resistor being grounded, and the other end of the resistor being connected to the output of control module, and the other end of the resistor being connected to the input of the control module.

3. The vehicle starting power supply according to claim 2, further comprising a battery voltage self-checking circuit, wherein the battery voltage self-checking circuit comprises a resistor, a resistor a resistor and a capacitor, the resistor and the resistor being connected in series, one end of the resistor and one end of the resistor being connected to the lithium battery respectively, the resistor being connected in parallel across two ends of the resistor, and the capacitor being connected in parallel across two ends of the resistor, the other end of the resistor being connected to the input of the control module.

4. The vehicle starting power supply according to claim 2, wherein the battery voltage detection circuit comprises a resistor, a resistor, a resistor and a capacitor, the resistor, the resistor and the resistor being sequentially connected in series, one end of the resistor being connected with the lithium battery, one end of the resistor being grounded, the capacitor being connected across two ends of the resistors in parallel, one end of the resistor being connected with the automobile battery, and the other end of the resistor being connected to the input of the control module.

5. The vehicle starting power supply according to claim 2, wherein the battery reverse connection detection circuit comprises a diode, a resistor a resistor and an optocoupler, one end of the resistor being connected with a cathode of the optocoupler, the other end of the resistor being connected with the automobile battery, a cathode of the diode being connected with an anode of the optocoupler, an anode of the diode being grounded, and an emitter of the optocoupler being grounded, a collector of the optocoupler being connected to one end of the resistor, the other end of the resistor being connected to a high level, and the collector of the optocoupler being connected to the input of the control module.

6. The vehicle starting power supply according to claim 1, further comprising a first USB driving circuit and a second USB driving circuit, a voltage input of the first USB driving circuit being connected to the other end of the resistor, and a voltage input of the second USB driving circuit being connected to the other end of the resistor.

7. The vehicle starting power supply according to claim 1, further comprising a power supply circuit, wherein the power supply circuit comprises a diode, a diode, a resistor, a capacitor, a capacitor, a capacitor, a capacitor, a capacitor, a voltage regulator and a TVS tube, an anode of the diode being connected to the socket, and an anode of the diode being connected to the lithium battery, a cathode of the diode and a cathode of the diode being both connected to one end of the resistor, the other end of the resistor being connected to an input of the voltage regulator, the capacitor and the capacitor being connected in parallel to the input and a ground terminal of the voltage regulator respectively, and the capacitor, the capacitor, the capacitor and the TVS tube being connected in parallel to an output and the ground terminal of the voltage regulator respectively.

8. The vehicle starting power supply according to claim 7, further comprising a temperature detection and control circuit and a temperature operation voltage circuit, wherein the temperature operation voltage circuit comprises a resistor, a resistor a resistor an NMOS transistor and a PMOS transistor, one end of the resistor being connected with the output of the control module, and the other end of the resistor being connected with a gate of the NMOS transistor and one end of the resistor respectively, a source of the NMOS transistor and the other end of the resistor being both grounded, a drain of the NMOS transistor being connected to a gate of the PMOS transistor and one end of the resistor respectively, a source of the PMOS transistor and the other end of the resistor being connected to the output of the voltage regulator respectively, and a drain of the PMOS transistor outputting an operating voltage of the temperature detection and control circuit.

9. The vehicle starting power supply according to claim 7, wherein the battery reverse connection detection circuit comprises a diode, a resistor, a resistor and an optocoupler, one end of the resistor being connected with a cathode of the optocoupler the other end of the resistor being connected with the automobile battery, a cathode of the diode being connected with an anode of the optocoupler, an anode of the diode being grounded, and an emitter of the optocoupler being grounded, a collector of the optocoupler being connected to one end of the resistor, the other end of the resistor being connected to a high level, and the collector of the optocoupler being connected to the input of the control module.

10. The vehicle starting power supply according to claim 8, wherein the temperature detection and control circuit comprises a heating sheet and a temperature sensor, the temperature sensor being configured to detect a temperature of the lithium battery, and the heating sheet being configured for heating the lithium battery.

11. The vehicle starting power supply according to claim 8, further comprising a battery voltage self-checking circuit, wherein the battery voltage self-checking circuit comprises a resistor, a resistor a resistor and a capacitor, the resistor and the resistor being connected in series, one end of the resistor and one end of the resistor being connected to the lithium battery respectively, the resistor being connected in parallel across two ends of the resistor, and the capacitor being connected in parallel across two ends of the resistor, the other end of the resistor being connected to the input of the control module.

12. The vehicle starting power supply according to claim 8, wherein the battery voltage detection circuit comprises a resistor, a resistor, a resistor and a capacitor, the resistor, the resistor and the resistor being sequentially connected in series, one end of the resistor being connected with the lithium battery, one end of the resistor being grounded, the capacitor being connected across two ends of the resistor in parallel, one end of the resistor being connected with the automobile battery, and the other end of the resistor being connected to the input of the control module.

13. The vehicle starting power supply according to claim 8, wherein the battery reverse connection detection circuit comprises a diode, a resistor a resistor and an optocoupler, one end of the resistor being connected with a cathode of the optocoupler, the other end of the resistor being connected with the automobile battery, a cathode of the diode being connected with an anode of the optocoupler, an anode of the diode being grounded, and an emitter of the optocoupler being grounded, a collector of the optocoupler being connected to one end of the resistor the other end of the resistor being connected to a high level, and the collector of the optocoupler being connected to the input of the control module.

14. The vehicle starting power supply according to claim 1, further comprising a battery voltage self-checking circuit, wherein the battery voltage self-checking circuit comprises a resistor, a resistor, a resistor and a capacitor, the resistor and the resistor being connected in series, one end of the resistor and one end of the resistor being connected to the lithium battery respectively, the resistor being connected in parallel across two ends of the resistor, and the capacitor being connected in parallel across two ends of the resistor the other end of the resistor being connected to the input of the control module.

15. The vehicle starting power supply according to claim 1, wherein the battery voltage detection circuit comprises a resistor a resistor, a resistor and a capacitor, the resistor, the resistor and the resistor being sequentially connected in series, one end of the resistor being connected with the lithium battery, one end of the resistor being grounded, the capacitor being connected across two ends of the resistor in parallel, one end of the resistor being connected with the automobile battery, and the other end of the resistor being connected to the input of the control module.

16. The vehicle starting power supply according to claim 1, wherein the battery reverse connection detection circuit comprises a diode, a resistor a resistor and an optocoupler, one end of the resistor being connected with a cathode of the optocoupler, the other end of the resistor being connected with the automobile battery, a cathode of the diode being connected with an anode of the optocoupler, an anode of the diode being grounded, and an emitter of the optocoupler (PCI) being grounded, a collector of the optocoupler being connected to one end of the resistor, the other end of the resistor being connected to a high level, and the collector of the optocoupler being connected to the input of the control module.

17. A vehicle starting power supply, comprising: a control module; a charging and discharging circuit, an input of the charging and discharging circuit being connected with an output of the control module, the charging and discharging circuit being configured for charging and discharging a lithium battery; a battery voltage detection circuit, an input of the battery voltage detection circuit being connected with an automobile battery, an output of the battery voltage detection circuit being connected with an input of the control module; a battery reverse connection detection circuit, an input of the battery reverse connection detection circuit being connected with the automobile battery, an output of the battery reverse connection detection circuit being connected with the input of the control module; an alarm response circuit, an input of the alarm response circuit being connected with the output of the control module; a display circuit, an input of the display circuit being connected with the output of the control module; and a relay driving circuit being configured for connecting or disconnecting a discharge circuit between the lithium battery and the automobile battery, wherein the battery voltage detection circuit comprises a resistor, a resistor, a resistor and a capacitor the resistor the resistor and the resistor being sequentially connected in series, one end of the resistor being connected with the lithium battery, one end of the resistor being grounded, the capacitor being connected across two ends of the resistor in parallel, one end of the resistor being connected with the automobile battery, and the other end of the resistor being connected to the input of the control module.

18. A vehicle starting power supply, comprising: a control module; a charging and discharging circuit, an input of the charging and discharging circuit being connected with an output of the control module, the charging and discharging circuit being configured for charging and discharging a lithium battery; a battery voltage detection circuit, an input of the battery voltage detection circuit being connected with an automobile battery, an output of the battery voltage detection circuit being connected with an input of the control module; a battery reverse connection detection circuit, an input of the battery reverse connection detection circuit being connected with the automobile battery, an output of the battery reverse connection detection circuit being connected with the input of the control module; an alarm response circuit, an input of the alarm response circuit being connected with the output of the control module; a display circuit, an input of the display circuit being connected with the output of the control module; and a relay driving circuit being configured for connecting or disconnecting a discharge circuit between the lithium battery and the automobile battery; wherein the battery reverse connection detection circuit comprises a diode, a resistor, a resistor and an optocoupler, one end of the resistor being connected with a cathode of the optocoupler, the other end of the resistor being connected with the automobile battery, a cathode of the diode being connected with an anode of the optocoupler, an anode of the diode being grounded, and an emitter of the optocoupler being grounded, a collector of the optocoupler being connected to one end of the resistor, the other end of the resistor being connected to a high level, and the collector of the optocoupler being connected to the input of the control module.

* * * * *